(12) United States Patent
Mihan et al.

(10) Patent No.: US 9,771,439 B2
(45) Date of Patent: Sep. 26, 2017

(54) POLYMERIZATION PROCESS IN THE PRESENCE OF AN ANTISTATIC COMPOSITION

(71) Applicant: Basell Polyolefine GmbH, Wesseling (DE)

(72) Inventors: Shahram Mihan, Bad Soden (DE); Gerhardus Meier, Frankfurt/M (DE); Ulf Schueller, Frankfurt/M (DE); Michael Schiendorfer, Frankfurt (DE); Jens Wiesecke, Zwingenberg (DE)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 14/897,597

(22) PCT Filed: Jun. 10, 2014

(86) PCT No.: PCT/EP2014/061977
§ 371 (c)(1),
(2) Date: Dec. 10, 2015

(87) PCT Pub. No.: WO2014/198693
PCT Pub. Date: Dec. 18, 2014

(65) Prior Publication Data
US 2016/0130376 A1  May 12, 2016

(30) Foreign Application Priority Data

Jun. 11, 2013  (EP) ..................... 13171408

(51) Int. Cl.
C08F 10/02 (2006.01)
C08F 210/16 (2006.01)
C08F 110/02 (2006.01)
H01B 1/12 (2006.01)

(52) U.S. Cl.
CPC ............ C08F 110/02 (2013.01); C08F 10/02 (2013.01); H01B 1/12 (2013.01); C08F 2410/02 (2013.01)

(58) Field of Classification Search
CPC ............................. C08F 2410/02; C08F 2/005
See application file for complete search history.

(56) References Cited

U.S. PATENT DOCUMENTS

| | | | |
|---|---|---|---|
| 3,296,170 A | 1/1967 | Burkhart et al. | |
| 4,182,810 A | 1/1980 | Willcox | |
| 4,855,370 A * | 8/1989 | Chirillo | C08F 10/00 526/138 |
| 5,026,795 A | 6/1991 | Hogan | |
| 6,022,935 A | 2/2000 | Fischer et al. | |
| 6,111,034 A * | 8/2000 | Goode | C08F 10/00 526/161 |
| 6,335,042 B1 * | 1/2002 | Money | A47G 21/001 229/87.08 |
| 6,777,492 B1 * | 8/2004 | Nakai | C08F 265/04 524/504 |
| 6,894,127 B2 | 5/2005 | Behue et al. | |
| 7,838,607 B2 | 11/2010 | Mihan | |
| 8,128,842 B2 | 3/2012 | Minder et al. | |
| 2002/0091208 A1 | 7/2002 | Benazouzz et al. | |
| 2008/0161510 A1 * | 7/2008 | Do Nascimento | C08F 10/02 526/74 |
| 2010/0210797 A1 * | 8/2010 | Gray | C08F 110/02 526/90 |
| 2011/0065846 A1 | 3/2011 | Grosjean et al. | |
| 2012/0283369 A1 * | 11/2012 | Koelling | C08F 10/00 524/157 |

FOREIGN PATENT DOCUMENTS

| | | |
|---|---|---|
| CN | 101511926 A | 8/2009 |
| CN | 102162193 A | 8/2011 |
| EP | 366823 A1 | 5/1990 |
| JP | S54139984 A | 10/1979 |
| JP | S6157608 A | 3/1986 |
| JP | H02145608 A | 6/1990 |
| JP | H06199943 A | 7/1994 |
| JP | H1060032 A | 3/1998 |
| JP | 2002544294 A | 12/2002 |
| RU | 2447099 C2 | 4/2012 |
| WO | WO-0240554 A1 | 5/2002 |
| WO | WO-2007131646 A1 | 11/2007 |
| WO | WO 2010/080871 A1 * | 7/2010 ............. C08F 10/00 |
| WO | WO-2010080871 A1 | 7/2010 |
| WO | WO-2011031309 A1 | 3/2011 |
| WO | WO2011072850 A1 | 6/2011 |

OTHER PUBLICATIONS

PCT International Search Report & Written Opinion dated Jul. 29, 2014 for PCT/EP2014/061977.
Singapore Search Report and Written Opinion for SG Patent Application No. 11201509669V dated Oct. 31, 2016.

* cited by examiner

Primary Examiner — Rip A Lee

(57) ABSTRACT

A process for the preparation of polyolefins by polymerizing olefins at temperatures of from 20 to 200° C. and pressures of from 0.1 to 20 MPa in the presence of a polymerization catalyst and an antistatically acting composition in a polymerization reactor, wherein the antistatically acting composition is a mixture comprising an oil-soluble surfactant and water and the use of an antistatically acting composition comprising an oil-soluble surfactant and water as antistatic agent for the polymerization of olefins at temperatures of from 20 to 200° C. and pressures of from 0.1 to 20 MPa in the presence of a polymerization catalyst.

9 Claims, No Drawings

POLYMERIZATION PROCESS IN THE PRESENCE OF AN ANTISTATIC COMPOSITION

This application is the U.S. National Phase of PCT International Application PCT/EP2014/061977, filed Jun. 10, 2014, claiming benefit of priority to European Patent Application No. 13171408.1, filed Jun. 11, 2013, the disclosures of which are incorporated herein by reference in their entirety.

FIELD OF THE INVENTION

The present technology relates to a process for the preparation of polyolefins by polymerizing olefins at temperatures of from 20 to 200° C. and pressures of from 0.1 to 20 MPa in the presence of a polymerization catalyst and an antistatic composition in a polymerization reactor.

BACKGROUND OF THE INVENTION

Antistatic agents are often used in the continuous polymerization of olefins to avoid electrostatic charging. In the context of olefin polymerization these compounds may also be referred to as antifouling agents, activity inhibitors, productivity inhibitors or kinetic modifiers. Antistatic agents can comprise compounds which have polar functional groups such as acids, ester groups, amines, amide groups, hydroxyl or ether groups that demonstrate "antistatic" behavior. Examples of antistatic compounds are polysulfone copolymers, polymeric polyamines, polyalcohols, hydroxyesters of polyalcohols, salts of alkylarylsulfonic acids, polysiloxanes, alkoxyamines and polyglycol ethers.

Quite efficient as antistatic agents are compositions which comprise more than one antistatically acting compound. U.S. Pat. No. 3,917,466 teaches antistatic additive compositions comprising a polysulfone copolymer, a polymeric polyamine, an oil-soluble sulfonic acid and a solvent. WO 2008/107371 A2 refers to similar compositions comprising specific organic solvents with a high boiling point. The use of such compositions as antistatic agents for the polymerization of olefins is, for example, described in U.S. Pat. No. 5,026,795, WO 2002/40554, WO 2007/131646 or WO 2011/072850. However, the antistatic agents described therein often negatively impact the activity of most olefin polymerization catalysts. Their efficiency is also limited, as they can create issues regarding sheeting and lump formation because of electrostatic charging for certain products such as polyolefins with relatively high molecular weight. Moreover, many commercially used mixtures contain substances such as substituted benzenes or naphthalenes that are often not approved for food contact.

Previous attempts to utilize simple chemical compounds for avoiding or reducing electrostatic charges within the polymerization reactor have been reported. For example, EP 0 315 192 A1 teaches the use of oxygen, nitric oxide, alcohols containing up to 7 carbon atoms or ketones containing up to 7 carbon atoms, while EP 0 366 823 A1 discloses a method for reducing sheeting during polymerization of α-olefins by introducing water into a polymerization reactor in order to influence the electrostatic levels at the site of possible sheet formation. The water is added by bubbling nitrogen through a tank filled with water and the water saturated nitrogen is then introduced into the olefin feed line of the reactor. However, this method is not suitable for nitrogen-free polymerization processes.

Thus, it was the object of the present technology to overcome the disadvantages of the relevant technology area and to find a process for the polymerization of olefins in the presence of an antistatic agent which is simple to carry out, does not deteriorate the product properties of the prepared polyolefins, does not impair or even improve the activity of the catalyst, provides a good operability of the polymerization process including with regards to the formation of fines (very small polyolefin particles) and may be approved for use in food, beverage and pharmaceutical applications.

SUMMARY OF THE INVENTION

The present technology relates to the preparation of polyolefins at temperatures in a range of from 20 to 200° C. and pressures of from 0.1 to 20 MPa in the presence of a polymerization catalyst and an antistatically acting composition, alternatively referred to as an antistatic composition, in a polymerization reactor, wherein the antistatically acting composition is a mixture comprising an oil-soluble surfactant and water. In some embodiments, the technology relates to the use of an antistatically acting composition comprising an oil-soluble surfactant and water as antistatic agent for the polymerization of olefins at temperatures of from 20 to 200° C. and pressures of from 0.1 to 20 MPa in the presence of a polymerization catalyst.

DETAILED DESCRIPTION OF THE INVENTION

The present disclosure provides for an olefin polymerization process including the polymerization of 1-olefins, i.e. hydrocarbons having terminal double bonds. Monomers can be used in accordance with embodiments of the present technology include olefinically unsaturated compounds such as ester or amide derivatives of acrylic or methacrylic acid, including acrylates, methacrylates, or acrylonitrile. Nonpolar olefinic compounds, including aryl-substituted 1-olefins, linear or branched $C_2$-$C_{12}$-1-alkenes such as ethylene, propylene, 1-butene, 1-pentene, 1-hexene, 1-heptene, 1-octene, 1-decene or branched $C_2$-$C_{10}$-1-alkenes such as 4-methyl-1-pentene, conjugated and nonconjugated dienes such as 1,3-butadiene, 1,4-hexadiene or 1,7-octadiene or vinylaromatic compounds such as styrene or substituted styrene and mixtures of various 1-olefins may be utilized in accordance with some embodiments of the present invention. Olefins for use in the present technology also include those in which the double bond is part of a cyclic structure comprising one or more ring systems such as cyclopentene, norbornene, tetracyclododecene or methylnorbornene or dienes such as 5-ethylidene-2-norbornene, norbornadiene or ethylnorbornadiene as well as mixtures of cyclic olefins.

The present technology further includes the homopolymerization or copolymerization of ethylene or propylene. Comonomers for use in propylene polymerization include up to 40 wt. % of ethylene and/or 1-butene, such as from 0.5 wt. % to 35 wt. % of ethylene and/or 1-butene. Comonomers for use in ethylene polymerization include up to 20 wt. %, from 0.01 wt. % to 15 wt. % and from 0.05 wt. % to 12 wt. % of $C_3$-$C_8$-1-alkenes such as particular 1-butene, 1-pentene, 1-hexene and/or 1-octene, including processes in which ethylene is copolymerized with from 0.1 wt. % to 12 wt. % of 1-hexene and/or 1-butene.

The process of the present technology may be used in the preparation of polyethylenes having a $MFR_{21.6}$ at a temperature of 190° C. under a load of 21.6 kg, determined according to DIN EN ISO 1133:2005, condition G, of from 0.5 to 300 g/10 min, including from 1 to 100 g/10 min, from 1.2 to 60 g/10 min and from 1.5 to 35 g/10 min.

The process can be carried out using industrially available low-pressure polymerization methods at temperatures in the range from 20 to 200° C., including from 30 to 150° C. and from 40 to 130° C., and under pressures of from 0.1 to 20 MPa including from 0.3 to 5 MPa. The polymerization can be carried out batchwise or continuously in one or more stages. Solution processes, suspension processes, stirred gas-phase processes and gas-phase fluidized-bed processes may be used in accordance with the present technology. Polymerization processes for use with the present technology include gas-phase polymerization such as in gas-phase fluidized-bed reactors and suspension polymerization, including in loop reactors or stirred tank reactors.

In some embodiments of the present technology, the polymerization process is a suspension polymerization in a suspension medium, e.g. in an inert hydrocarbon such as isobutane or mixtures of hydrocarbons or else in the monomers themselves. Suspension polymerization temperatures may be in the range from 20 to 115° C., and the pressure may be in the range of from 0.1 to 10 MPa. The solids content of the suspension may be in the range of from 10 to 80 wt. %. The polymerization can be carried out both batchwise, e.g. in stirred autoclaves, and continuously, e.g. in tubular reactors including in loop reactors. In some embodiments, the polymerization can be carried out by the Phillips PF process as described in U.S. Pat. Nos. 3,242,150 and 3,248,179.

Suspension media for use in the present technology include media suitable for use in suspension reactors. The suspension medium may be inert and may be liquid or supercritical under the reaction conditions and may have a boiling point which is different from those of the monomers and comonomers used in order to make it possible for these starting materials to be recovered from the product mixture by distillation. Customary suspension media include saturated hydrocarbons having from 4 to 12 carbon atoms, for example isobutane, butane, propane, isopentane, pentane and hexane, or a mixture of these, as well as diesel oil.

In some suspension polymerization processes, the polymerization takes place in a cascade of two, three or four stirred vessels. The molecular weight of the polymer fraction prepared in each of the reactors may be set by addition of hydrogen to the reaction mixture. The polymerization process may be carried out with the highest hydrogen concentration and the lowest comonomer concentration, based on the amount of monomer, being set in the first reactor. In the subsequent further reactors, the hydrogen concentration is gradually reduced and the comonomer concentration is altered, in each case once again based on the amount of monomer. In some embodiments, ethylene or propylene may be used as the monomer and a 1-olefin having from 4 to 10 carbon atoms may be used as the comonomer.

In some embodiments, a suspension polymerization process is suspension polymerization in loop reactors, where the polymerization mixture is pumped continuously through a cyclic reactor tube. As a result of the pumped circulation, continual mixing of the reaction mixture is achieved, the catalyst introduced and the monomers are fed and distributed in the reaction mixture. Furthermore, the pumped circulation prevents sedimentation of the suspended polymer. The removal of the heat of reaction via the reactor wall is also promoted by the pumped circulation. In general, these reactors may consist of a cyclic reactor tube having one or more ascending legs and one or more descending legs which are enclosed by cooling jackets for removal of the heat of reaction and also horizontal tube sections which connect the vertical legs. The impeller pump, the catalyst feed facilities, the monomer feed facilities and the discharge facility (the settling legs) may be installed in the lower tube section. However, the reactor can also have more than two vertical tube sections, so that a meandering arrangement is obtained.

The suspension polymerization may be carried out in the loop reactor at an ethylene concentration of at least 5 mole percent or at least 10 mole percent based on the suspension medium. In this context, suspension medium does not mean the feed suspension medium such as isobutane alone but rather the mixture of this feed suspension medium with the monomers dissolved therein. The ethylene concentration can easily be determined by gas chromatographic analysis of the suspension medium.

In some embodiments, the polymerization process is carried out in a horizontally or vertically stirred or fluidized gas-phase reactor.

In further embodiments, gas-phase polymerization in a fluidized-bed reactor, in which the circulated reactor gas is fed in at the lower end of a reactor and is taken off again at its upper end, is utilized. When such a process is employed for the polymerization of 1-olefins, the circulated reactor gas may be a mixture of the 1-olefins to be polymerized, inert gases such as nitrogen and/or lower alkanes such as ethane, propane, butane, pentane or hexane may be used and optionally a molecular weight regulator such as hydrogen may be included. In some embodiments, nitrogen or propane as an inert gas may be used if appropriate in combination with further lower alkanes. The velocity of the reactor gas has to be sufficiently high to fluidize the mixed bed of finely divided polymer present in the tube and to serve as polymerization zone as well as to remove the heat of polymerization effectively. The polymerization can also be carried out in a condensed or super-condensed mode, in which part of the circulating gas may be cooled to below the dew point and returned to the reactor separately as a liquid and a gas phase or together as a two-phase mixture in order to make additional use of the enthalpy of vaporization for cooling the reaction gas.

In gas-phase fluidized-bed reactors, it is advisable to work at pressures of from 0.1 to 10 MPa, including from 0.5 to 8 MPa and from 1.0 to 3 MPa. In addition, the cooling capacity may depend on the temperature at which the polymerization in the fluidized bed is carried out. In some embodiments, the process may be carried out at temperatures of from 30 to 160° C., including from 65 to 125° C. In further embodiments, temperatures in the upper part of this range may be used for copolymers of relatively high density and temperatures in the lower part of this range may be used for copolymers of lower density.

Reactors for use with the present technology include multizone circulating reactors as described, for example, in WO 97/04015 and WO 00/02929. These reactors may comprise two interconnected polymerization zones, a riser, in which the growing polymer particles flow upward under fast fluidization or transport conditions, and a downcomer, in which the growing polymer particles flow in a densified form under the action of gravity. The polymer particles leaving the riser may enter the downcomer and the polymer particles leaving the downcomer may be reintroduced into the riser, thus establishing a circulation of polymer between the two polymerization zones, with the polymer capable of being passed a plurality of times through these two zones. It is also possible to operate the two polymerization zones of one multizone circulating reactor with different polymerization conditions by establishing different polymerization conditions in the riser and the downcomer. For instance, the gas mixture leaving the riser and entraining the polymer particles can be partially or totally prevented from entering the downcomer. This arrangement can be achieved by feeding a barrier fluid in form of a gas and/or a liquid mixture into the downcomer, such as in the upper part of the downcomer. In some embodiments, the barrier fluid has a composition different from that of the gas mixture present in the riser. The amount of added barrier fluid can be adjusted in a way that an upward flow of gas countercurrent to the flow of the polymer particles is generated, particularly at the upper part, thereby acting as a barrier to the gas mixture entrained among the particles coming from the riser. In this manner it is possible to obtain two different gas composition zones in one multizone circulating reactor. It is also possible to introduce make-up monomers, comonomers, molecular weight regulator(s) such as hydrogen and/or inert fluids at any point of the downcomer, such as below the barrier feeding point. It is also possible to create varying monomer, comonomer and/or hydrogen concentrations along the downcomer for producing further differentiation of the polymerization conditions.

The gas-phase polymerization processes according to the present technology may be carried out in the presence of a $C_3$-$C_5$ alkane as polymerization diluent such as in the presence of propane for the homopolymerization or copolymerization of ethylene.

The polymerization processes can also be connected in series to form a polymerization cascade. A single reactor or a parallel arrangement of reactors using two or more different or identical processes is possible.

The polymerization of olefins can be carried out using commercially available olefin polymerization catalysts, including Phillips catalysts based on chromium oxide, titanium-based Ziegler- or Ziegler-Natta-catalysts and single-site catalysts. As described herein, single-site catalysts are catalysts based on chemically uniform transition metal coordination compounds. It is also possible to use mixtures of two or more of these catalysts for the polymerization of olefins. Such mixed catalysts can be designated as hybrid catalysts.

Catalysts for use in the present technology include catalysts of the Phillips type, which may be prepared by applying a chromium compound to an inorganic support and subsequently calcinating this at temperatures in the range from 350 to 950° C., resulting in chromium present in valences lower than six being converted into the hexavalent state. In addition to chromium, elements such as magnesium, calcium, boron, aluminum, phosphorus, titanium, vanadium, zirconium or zinc and combinations thereof can also be used. In some embodiments, the catalyst precursor can be doped with fluoride prior to or during calcination. In accordance with the present disclosure, supports for Phillips catalysts may comprise aluminum oxide, silicon dioxide (silica gel), titanium dioxide, zirconium dioxide or their mixed oxides or cogels, and aluminum phosphate. Further support materials can be obtained by modifying the pore surface area, e.g. by means of compounds of the elements boron, aluminum, silicon and phosphorus including silica gel such as spherical or granular silica gels that may optionally be spray dried. The activated chromium catalysts can subsequently be prepolymerized or prereduced. The prereduction may be carried out by means of cobalt or by means of hydrogen at 250 to 500° C., including at 300 to 400° C., in an activator.

Catalysts for use in the present technology include single-site catalysts, such as those comprising bulky sigma- or pi-bonded organic ligands, e.g. catalysts based on mono-Cp complexes, catalysts based on bis-Cp complexes, also known as metallocene catalysts, or catalysts based on late transition metal complexes, in particular iron-bisimine complexes. Catalysts may further comprise mixtures of two or more single-site catalysts or mixtures of different types of catalysts comprising at least one single-site catalyst.

Ziegler type catalysts comprising a compound of titanium or vanadium, a compound of magnesium and optionally an electron donor compound and/or a particulate inorganic oxide as support may be used in accordance with the present technology. Such Ziegler type catalysts may be polymerized in the presence of a cocatalyst. Cocatalysts may comprise organometallic compounds of Groups 1, 2, 12, 13 or 14 of the Periodic Table of Elements, including organometallic compounds of organoaluminum compounds. Cocatalysts may include organometallic alkyls, organometallic alkoxides, or organometallic halides.

The polyolefin particles produced in accordance with the present technology have a generally regular morphology and size, depending on the catalyst morphology, size and polymerization conditions. Depending on the catalyst used, the polyolefin particles may exhibit a mean diameter of from a few hundred to a few thousand micrometers. In the case of chromium catalysts, the mean particle diameter may be from about 300 to about 1600 µm, and in the case of Ziegler type catalysts the mean particle diameter may be in a range of from about 500 to about 3000 µm.

The antistatically acting composition of the present technology is a mixture comprising an oil-soluble surfactant and water. In some embodiments, the oil-soluble surfactant may be an ionic oil-soluble surfactant including a strong organic acid comprising a hydrocarbyl group of from 6 to 40 carbon atoms.

Organic acids for use in the present technology may comprise a hydrocarbyl group of from 6 to 40 carbon atoms, including from 8 to 32 carbon atoms and from 10 to 24 carbon atoms, and may comprise a strong organic acid. Accordingly, the pKa of the organic acids may be equal to or less than +4, including equal to or less than +3 and equal to or less than +2. Classes of organic acids for use in the present technology include organic sulfonic acids, organic sulfinic acids or organic phosphonic acids. Due to the relatively long-chain or relatively voluminous alkyl group, such organic acids have a good solubility in hydrocarbons like oil.

Hydrocarbyl groups for use in the present technology include linear or branched alkyl or alkenyl radicals, e.g. n-hexyl, n-heptyl, n-octyl, 2-ethylhexyl, n-nonyl, n-decyl, 2-propylheptyl, n-undecyl, n-dodecyl, n-tridecyl, isotridecyl, n-tetradecyl, n-pentadecyl, n-hexadecyl, n-heptadecyl, n-octadecyl, n-nonadecyl, n-eicosyl, n-heneicosyl, n-docosyl, n-tricosyl, n-tetracosyl, oleyl, linolyl or linolenyl, cycloalkyl radicals, e.g. cyclohexyl, methyl-cyclohexyl or dimethylcyclohexyl, aryl radicals, e.g. phenyl or naphthyl, aralkyl radicals, e.g. benzyl or 2-phenylethyl, and alkaryl radicals such as phenyl or naphthyl substituted with linear or branched $C_1$- to $C_{18}$-alkyl groups, e.g. tolyl, xylyl, n-nonylphenyl, n-decylphenyl, n-dodecylphenyl, isotridecylphenyl, n-nonylnaphthyl, di-n-nonylnaphthyl, n-decylnaphthyl, di-n-decylnaphthyl, n-dodecylnaphthyl, di-n-dodecylnaphthyl, isotridecylnaphthyl and diisotridecylnaphthyl. Monosubstituted phenyl radicals may comprise alkyl groups in the ortho-, meta- or para-position with respect to the sulfonic acid group. Examples of these organic acids include dinonylnaphthylsulfonic acids, dodecylbenzenesulfonic acids, n-nonylbenzenesulfonic acid, n-decyl-benzenesulfonic acid, n-dodecylbenzenesulfonic acid, isotridecylbenzenesulfonic acid, n-nonylnaphthylsulfonic acid, di-n-nonylnaphthylsulfonic acid, n-decylnaphthylsulfonic acid, di-n-decylnaphthylsulfonic acid, n-dodecylnaphthylsulfonic acid, di-n-dodecyl-naphthylsulfonic acid, isotridecylnaphthylsulfonic acid and diisotridecylnaphthylsulfonic acid.

Commercial dodecylbenzenesulfonic acids often comprise a mixture of different isomers such as unbranched alkyl chains. Furthermore, commercial dodecylbenzenesulfonic acids may contain alkylbenzenesulfonic acid compounds that feature alkyl chain lengths different from $C_{12}$.

The antistatically acting composition of the present technology can be introduced into the reactor with the aid of methodologies known to the skilled artisan. It is possible to introduce the components of the composition into the reactor as separated feeds or first mixtures of some or all of the components may be prepared and then the mixture or the mixtures may be introduced into the reactor. The feeding can occur directly into the reactor or into a line leading to the reactor. The antistatically acting composition or its components can be introduced into the reactor together with other charged materials. However, it is also possible to introduce the antistatically acting composition or its components separately.

In some embodiments, the amount of oil-soluble surfactant introduced into the polymerization reactor is from 0.025 to 50 ppm per weight, including from 1 to 30 ppm per weight and from 1 to 20 ppm per weight with respect to the weight of the prepared polyolefin, while the amount of water introduced into the polymerization reactor is from 0.005 to 0.5 ppm per weight, including from 0.01 to 0.4 ppm per weight and from 0.05 to 0.35 ppm per weight, referring to the weight of the prepared polyolefin.

In some embodiments, the antistatically acting composition comprises an alcohol beside the oil-soluble surfactant and water such as linear or branched $C_1$-$C_{12}$ alcohols, which can be mono-alcohols, diols or triols such as mono-alcohols having from 1 to 4 carbon atoms as well as ethylene glycol, glycerol, methanol, ethanol, n-propanol, isopropanol, n-butanol, sec-butanol, isobutanol, or tert-butanol. The amount of alcohol introduced into the polymerization reactor may be from 0.05 ppm to 5 ppm per weight, including from 0.1 to 3 ppm per weight and from 0.5 to 2 ppm per weight, referring to the weight of the prepared polyolefin.

In some embodiments, a mixture of the oil-soluble surfactant is initially produced, optionally followed by water, alcohol, and one or more aliphatic hydrocarbons. The mixture is then introduced into the polymerization reactor. Aliphatic hydrocarbons for preparing such mixtures include linear, branched or alicyclic hydrocarbons ranging from 3 to 40 carbon atoms, including aliphatic hydrocarbons having from 5 to 12 carbon atoms, white mineral oils having from 15 to 40 carbon atoms as well as pentane, hexane and heptane.

The preparation of the mixture can be carried out according to methods known in the relevant technology area, e.g. by stirring or shaking. The preparation may be carried out at temperatures where the hydrocarbon is in liquid state, including from 20° C. to 50° C. to facilitate homogenization of the mixtures. The prepared mixtures may comprise homogeneous mixtures which do not separate over time. In some embodiments, the mixtures comprise at least 30 wt. % of aliphatic hydrocarbon including at least 40 wt. % of aliphatic hydrocarbon. Mixtures may comprise from 10 to 69.9 wt. % oil-soluble surfactant, from 0.1 to 2 wt. % water, from 0 to 15 wt. % alcohol and from 30 to 89.9 wt. % aliphatic hydrocarbon, including from 20 to 50 wt. % oil-soluble surfactant, from 0.2 to 1 wt. % water, from 2 to 10 wt. % alcohol and from 40 to 77.8 wt. % aliphatic hydrocarbon.

Depending on the kind of the polymerization and the dimension of available means for feeding, a prepared mixture of the components of the antistatically acting composition and a hydrocarbon can be fed to the reactor in an undiluted or diluted form, including a form diluted by an aliphatic hydrocarbon. Hydrocarbons for diluting such a prepared mixture include propane, isobutane, n-hexane, isohexane, EXXOL® grade hydrocarbons obtainable from ExxonMobil Chemical and white mineral oils. In some embodiments, a diluted form comprises a mixture of the components of the antistatically acting composition and a hydrocarbon with a further hydrocarbon used as diluent or suspension medium in the polymerization process.

The antistatically acting composition of the present technology may be useful for the polymerization of olefins at temperatures in a range of from 20 to 200° C. and pressures in a range of from 0.1 to 20 MPa in the presence of a polymerization catalyst.

Using the antistatically acting composition of the present technology results in a process for the polymerization of olefins in the presence of an antistatic agent that is advantageously simple to carry out and has good operability with regards to a reduction in the tendency for forming polymer deposits on the rector wall, i.e. reactor fouling, and for forming lumps and fines, i.e. for forming very small polyolefin particles. Moreover, the activity of the catalyst is improved or at least not impaired and the product properties of the prepared polyolefins are not deteriorated. Furthermore, using the antistatically acting composition of the present technology beneficially does not necessitate the addition of non-food-contact approved substances to the polymerization.

The present technology is illustrated below with the aid of the following non-limiting examples.

EXAMPLES

The electrostatic charges present in the fluidized-bed reactor were measured by a sensor (Correstat 3410; Progression, Inc., Haverhill, Mass., USA), which monitors charge activity and polarity within the reactor. It has a measurement range from +/−0 to 0.1 nA (full scale). For the evaluation of the electrostatic charges inside the reactor, the difference between measured negative and positive charges was chosen. The maximum difference is 0.2 nA and is defined as 100% scale, while no variation in the electrostatic charge is referred to as 0% scale.

The determination of the particle size distribution of the produced polyethylene powder was carried out by dry sieving analysis according to DIN 53477 (November 1992) with a set of 5 calibrated sieves (125 μm, 250 μm, 500 μm, 1000 μm, and 2000 μm).

Density was determined according to DIN EN ISO 1183-1:2004, Method A (Immersion) with compression molded plaques of 2 mm thickness. The compression molded plaques were prepared with a defined thermal history: pressed at a temperature (7) of 180° C. and a pressure (P) of 20 MPa for 8 minutes (min) with subsequent crystallization in boiling water for 30 min.

The melt flow rate $MFR_{21.6}$ was determined according to DIN EN ISO 1133:2005, condition G at T=190° C. under a load of 21.6 kilograms (kg).

Environmental stress cracking resistance was determined as FNCT (full-notch creep test) according to ISO 16770: 2004 at T=80° C. under a tensile stress of 3.5 MPa. Test specimen B was produced from the pellets via pressing of a corresponding sheet.

Impact strength was determined as tensile impact strength according to ISO 8256 (1997)/1A at T=−30° C. The test specimens were produced from pellets by pressing.

Example 1

Preparation of Catalyst I

A support was prepared as in Example 1, paragraph 1.1 of EP 0 535 516 A1.

The resulting support was then, in accordance with the specification in Example 1, paragraph 1.2 of EP 0 535 516 A1, treated with a solution of 4.1 wt.-% of chromium-(III) nitrate 9-hydrate. The chromium-doped support was then calcined, under conditions in other respects identical with those in Example 1, paragraph 1.2 of EP 0 535 516 A1, at 560° C.

The resulting chromium catalyst had a chromium content of 1.0 wt. %, a pore volume was 1.1 ml/g and a specific surface area was 350 m²/g.

Example 2

Preparation of Catalyst II

The support used (Grace Sylopol 332) was a granular $SiO_2$ support having a surface area (BET) of 320 m²/g and a pore volume of 1.75 mL/g. 141 L of a solution of $Cr(NO_3)_3 9H_2O$ in methanol (11.3 g/L) were added to 100 kg of the support. The solvent was removed by distillation under reduced pressure after 1 hour. The resulting intermediate contained 0.2% wt. % chromium.

The resulting intermediate product was calcined in a vapor-phase fluidized bed. The mixture was first heated to 300° C. with fluidization by pure nitrogen, which was subsequently replaced by air. The mixture was then heated to a final temperature of 680° C. over a period of 10 hours, after which the gas was switched back to nitrogen and the mixture cooled.

Example 3

Preparation of the Antistatic Composition 1800 grams (g) of dodecylbenzenesulfonic acid (CAS.-No. 27176-87-0; obtained from abcr GmbH & Co. KG, Karlsruhe, Germany) were added to 3807 g of n-heptane and stirred, followed by the addition of 360 g of isopropanol and 33 g of water. The mixture was shaken (not stirred) until a clear homogeneous stable formulation was obtained. The water content was measured by a 831 KF Coulometer (Deutsche METROHM GmbH & Co. KG, Filderstadt, Germany) to be 6200 ppm (+/−200 ppm). The resulting mixture had a composition of 0.6 wt. % water, 6 wt. % isopropanol, 30 wt. % dodecylbenzenesulfonic acid and 63.4 wt. % n-heptane.

Example 4

A high-density polyethylene was prepared using catalyst I obtained in Example 1. The polymerization was carried out in a stainless steel fluidized bed reactor having an internal diameter of 500 mm and equipped with a gas circulation system, cyclone, heat exchanger, control systems for temperature and pressure as well as feeding lines for ethylene, 1-hexene, nitrogen and hexane. The reactor pressure was maintained at 2.1 MPa. The catalyst was injected in a discontinuous way by means of a nitrogen dosing valve. In addition, trihexylaluminum (THA; obtained from Chemtura Organometallics GmbH, Bergkamen, Germany) was added to the reactor in an amount of 15 ppm per weight referring to the weight of the prepared polyolefin. The reactor throughput was kept at 50 kg/h.

The mixture prepared in Example 3 was added to the reactor as an antistatic agent in an amount of 6 ppm per weight referring to the weight of the prepared polyolefin. The dosing of the mixture prepared in Example 3 could optionally be further diluted in n-hexane.

The reaction conditions in the polymerization reactor and the properties of the obtained polyethylene are reported in Table 1.

Comparative Example A

Example 3 was repeated except for the use of an antistatic agent Statsafe 3000, which is commercially available from Innospec Limited, Cheshire, United Kingdom. The added amount was 6 ppm per weight referring to the weight of the prepared polyolefin. The dosing occurred in further diluted form as solution in n-hexane. Trihexylaluminum was fed to the reactor in an amount of 17 ppm per weight.

The reaction conditions in the polymerization reactor and the properties of the obtained polyethylene are reported in Table 1.

Example 5

A high-density polyethylene similar to the polyethylene obtained in Example 4 was prepared as in Example 3, however using catalyst II obtained in Example 2 which is more sensitive with respect to operability. The reactor throughput was kept at 50 kg/h.

The mixture prepared in Example 3 was added to the reactor as antistatic agent in an amount of 10 ppm per weight referring to the weight of the prepared polyolefin. The dosing of the mixture prepared in Example 3 occurred in further diluted form as solution in n-hexane. Trihexylaluminum was added in an amount of 18 ppm per weight referring to the weight of the prepared polyolefin.

The reaction conditions in the polymerization reactor and the properties of the obtained polyethylene are reported in Table 1.

Comparative Example B

Example 4 was repeated except for the use of the antistatic agent Statsafe 3000. The added amount was 7 ppm per weight referring to the weight of the prepared polyolefin. The dosing occurred in further diluted form as solution in n-hexane. Trihexylaluminum was fed to the reactor in an amount of 18 ppm per weight referring to the weight of the prepared polyolefin.

The reaction conditions in the polymerization reactor and the properties of the obtained polyethylene are reported in Table 1.

TABLE 1

|  | Example 4 | Comparative Example A | Example 5 | Comparative Example B |
|---|---|---|---|---|
| Reactor temperature [° C.] | 115.2 | 114.5 | 113.6 | 113.5 |
| Ethylene [% by vol.] | 54.8 | 55.2 | 54.6 | 52.6 |
| n-Hexane [% by vol.] | 4.0 | 4.0 | 4.0 | 4.0 |
| 1-Hexene [% by vol.] | 0.09 | 0.10 | 0.13 | 0.11 |
| Nitrogen [% by vol.] | 41.1 | 40.7 | 41.3 | 43.3 |
| Electrostatics [%] | 10 | 37 | 62 | 93 |
| PE particles <125 μm [wt.-%] | 0.4 | 0.9 | 0.7 | 2.2 |
| PE particles <250 μm [wt.-%] | 2.6 | 5.0 | 8.9 | 11.2 |
| Productivity [g of PE/g of solid catalyst] | 8540 | 6180 | 10840 | 6610 |
| Density [g/cm$^3$] | 0.9451 | 0.9467 | 0.9451 | 0.9466 |
| MFR$_{21.6}$ [g/10 min] | 5.5 | 5.6 | 4.7 | 6.0 |
| FNCT [h] | 52.6 | 46.8 | 34.9 | 31.8 |
| Tensile impact strength a$_m$ [kJ/m$^2$] | 150 | 159 | 160 | 148 |

The comparison of Examples 4 and 5 with Comparative Examples A and B shows that by employing an antistatically acting composition according to the present technology the electrostatic charges present in the fluidized-bed reactor are significantly lower than by using a commercially available antistatic agent and the amount of fines, i.e. the amount of very small polyolefin particles, is surprisingly reduced. On the other hand, the productivity of the catalyst is significantly increased. Moreover, the polymer properties of the obtained polyethylenes beneficially remain constant.

What is claimed is:

1. A polymerization process comprising polymerizing olefins at temperatures of 20-200° C. and pressures of 0.1-20 MPa in the presence of a polymerization catalyst and an antistatic composition in a polymerization reactor, wherein the antistatic composition is a mixture comprising an oil-soluble surfactant comprising a strong organic acid of a pK$_a$ of equal to or less than +4 and further comprising a hydrocarbyl group of from 6 to 40 carbon atoms, and water, wherein the polymerization is continuous and the antistatic composition is a mixture comprising an alcohol in an amount of 0.05-5 ppm per weight based on the weight of the prepared polyolefin.

2. The polymerization process of claim 1, wherein the oil-soluble surfactant is a dodecylbenzenesulfonic acid.

3. The polymerization process of claim 1, wherein the polymerization is carried out continuously and the amount of oil-soluble surfactant introduced into the polymerization reactor is 0.025 -50 ppm per weight referring to the weight of the prepared polyolefin and the amount of water introduced into the polymerization reactor is 0.005 -0.5 ppm per weight referring to the weight of the prepared polyolefin.

4. The polymerization process of claim 1, wherein a mixture of the oil-soluble surfactant, the water, an alcohol and one or more aliphatic hydrocarbons is prepared and said mixture is then introduced into the polymerization reactor.

5. The polymerization process of claim 4, wherein the alcohol is selected from the group consisting of methanol, ethanol and isopropanol.

6. The polymerization process of claim 1, wherein the polymerization is carried out in gas-phase in a fluidized bed reactor.

7. The polymerization process of claim 1, wherein the polymerization is carried out in suspension in a loop reactor or in a stirred tank reactor.

8. The polymerization process of claim 1, wherein the polymerization catalyst is a Phillips catalyst, a single-site catalyst or a mixture of catalysts comprising at least one single-site catalyst.

9. The polymerization process of claim 1, wherein the process comprises preparing a polyethylene having a MFR$_{21.6}$ at a temperature of 190° C. under a load of 21.6 kg of 0.5-300 g/10 min.

* * * * *